(12) United States Patent
Dees

(10) Patent No.: US 9,089,469 B2
(45) Date of Patent: Jul. 28, 2015

(54) SEX TRAINING DEVICE AND GAME

(71) Applicant: Nicole Dees, Peoria, AZ (US)

(72) Inventor: Nicole Dees, Peoria, AZ (US)

(*) Notice: Subject to any disclaimer, the term of this patent is extended or adjusted under 35 U.S.C. 154(b) by 151 days.

(21) Appl. No.: 13/674,038

(22) Filed: Nov. 11, 2012

(65) Prior Publication Data

US 2014/0135573 A1    May 15, 2014

(51) Int. Cl.

| | |
|---|---|
| *A61F 5/00* | (2006.01) |
| *A61H 19/00* | (2006.01) |
| *G09B 23/30* | (2006.01) |
| *G09B 23/32* | (2006.01) |
| *A63F 9/32* | (2006.01) |
| *A63F 9/06* | (2006.01) |
| *A63F 9/00* | (2006.01) |
| *A63F 9/24* | (2006.01) |

(52) U.S. Cl.
CPC .............. *A61H 19/44* (2013.01); *A63F 9/0611* (2013.01); *A63F 9/32* (2013.01); *G09B 23/303* (2013.01); *G09B 23/32* (2013.01); *A61H 2201/0103* (2013.01); *A61H 2201/5038* (2013.01); *A61H 2201/5043* (2013.01); *A61H 2201/5058* (2013.01); *A63F 2009/0007* (2013.01); *A63F 2009/2442* (2013.01); *A63F 2250/024* (2013.01); *A63F 2250/0428* (2013.01)

(58) Field of Classification Search
CPC ....... A61H 19/40; A61H 19/44; A61H 19/50; G09B 23/303; G09B 23/32
USPC ...................................................... 600/38–41
See application file for complete search history.

(56) References Cited

U.S. PATENT DOCUMENTS

| | | | | |
|---|---|---|---|---|
| 5,725,473 | A * | 3/1998 | Taylor | 600/38 |
| 5,851,175 | A * | 12/1998 | Nickell | 600/38 |
| 5,857,960 | A * | 1/1999 | Boutos | 600/38 |
| 6,142,929 | A * | 11/2000 | Padgett | 600/38 |
| 7,267,646 | B2 * | 9/2007 | Tucker | 600/38 |
| 7,762,945 | B2 * | 7/2010 | Blumenthal | 600/38 |

\* cited by examiner

*Primary Examiner* — John Lacyk
(74) *Attorney, Agent, or Firm* — Jeffrey Furr, Esq.; Furr Law Firm

(57) ABSTRACT

This is a Sexual Therapy Device. It is made of a base made of a firm material and covered with a soft covering. Attached at various locations are connectors that either cylinder extenders or dildo shape extensions can be connected to. With the various locations of the connectors a large number of penetration positions can be achieved to maximize the pleasure and sexual therapy of the user.

19 Claims, 19 Drawing Sheets

SEX TRAINING DEVICE AND GAME

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND OF INVENTION

1. Field of the Invention

The present invention is directed to a sexual therapy device in particular one that can be used as an Oral Sex training device and game.

2. Background

Humans engage in sex intercourse for reasons other than reproduction, such as physical and emotional pleasure. Within the last several decades, the existence and desirability of orgasm has been virtually universally accepted by civilized society. It helps couple feel closer to each other and provides needed exercise and tension release.

Humans perform sexual intercourse in countless different positions such as various positions of vaginal sex, oral sex and anal sex. Oral sex is sexual activity involving the stimulation of the genitalia of a sex partner by the use of the mouth, tongue, teeth or throat. Cunnilingus refers to oral sex performed on females while fellatio and irrumatio refer to oral sex performed on males.

Oral sex can be very popular as it provides much of the physical pleasure and release while reducing the risk of pregnancy. But there can be issues as many people do not know how to properly perform oral sex.

Digital manipulation of the genitalia of a sex partner is also a safe way to practice safe sex while fulfilling a partner's sexual desires and needs. Again, there are no good and simple training tools to teach digital manipulation of a partner's genitalia.

While a variety of products have been developed and used by humans to enhance sex none have been specifically designed to teach how to perform oral sex on a partner.

There is still room for improvement in the art.

SUMMARY OF THE INVENTION

This apparatus is an Oral Sex training device and game. Oral sex is sexual activity involving the stimulation of the genitalia of a sex partner by the use of the mouth, tongue, teeth or throat. Cunnilingus refers to oral sex performed on females while fellatio and irrumatio refer to oral sex performed on males. Oral sex can be very popular as it provides much of the physical pleasure and release while reducing the risk of pregnancy. But there can be issues as many people do not know how to properly perform oral sex. These same issues can be said about digital manipulation of a partner's sex organs.

The device consists of a base, a shaft extending from the base with the shaft being in a phallic shape in the shape of a man's penis with a control and display means attached to the base. In the preferred embodiment the base would also have two ovals connected to said shaft which would simulate a man's testicles. There would be sensors within the shaft of which most would be pressure sensors. These would also be contained in the ovals. There would be a high number of sensors on the tip of the sensor which would similar the high number of nerve endings at the tip of a man's penis.

The controller means and display means would allow a user to program what desires or wants of the user or user's partner. The display unit will display how the user is doing showing if the user has performed well enough to reach a climax or if the user has applied too much pressure.

BRIEF DESCRIPTION OF THE DRAWINGS

Without restricting the full scope of this invention, the preferred form of this invention is illustrated in the following drawings.

BRIEF DESCRIPTION OF THE PREFERRED EMBODIMENTS

There are a number of significant design features and improvements incorporated within the invention.

Figure 1A:
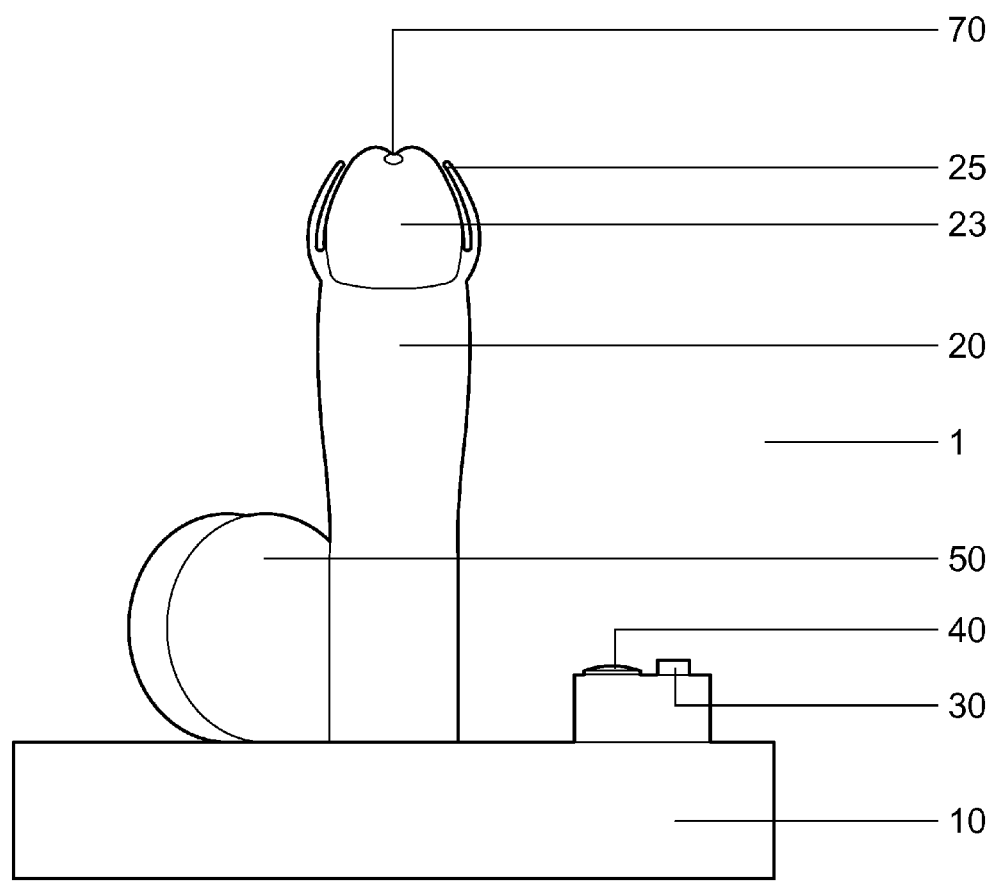
FIG. 1A is a side view of the Device.
Figure 1B:
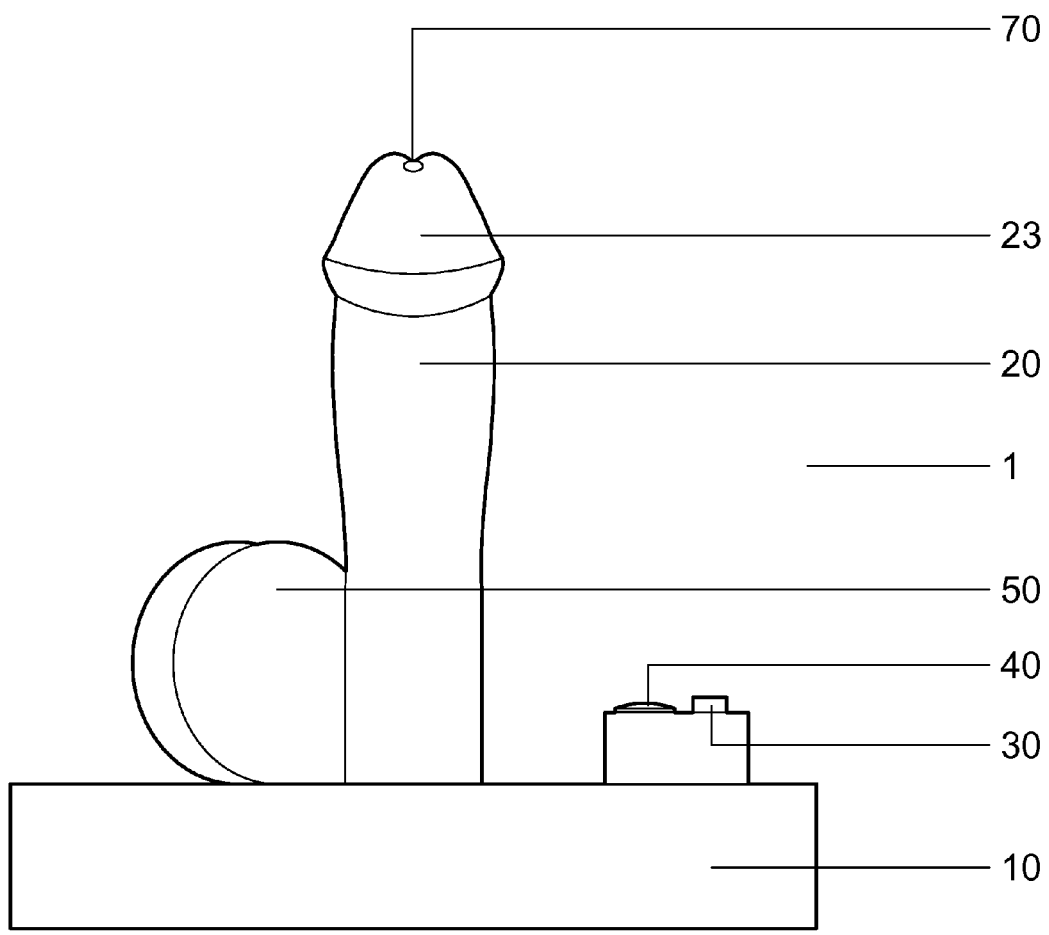
FIG. 1B is a side view of the circumcised version of the Device.
Figure 1C:
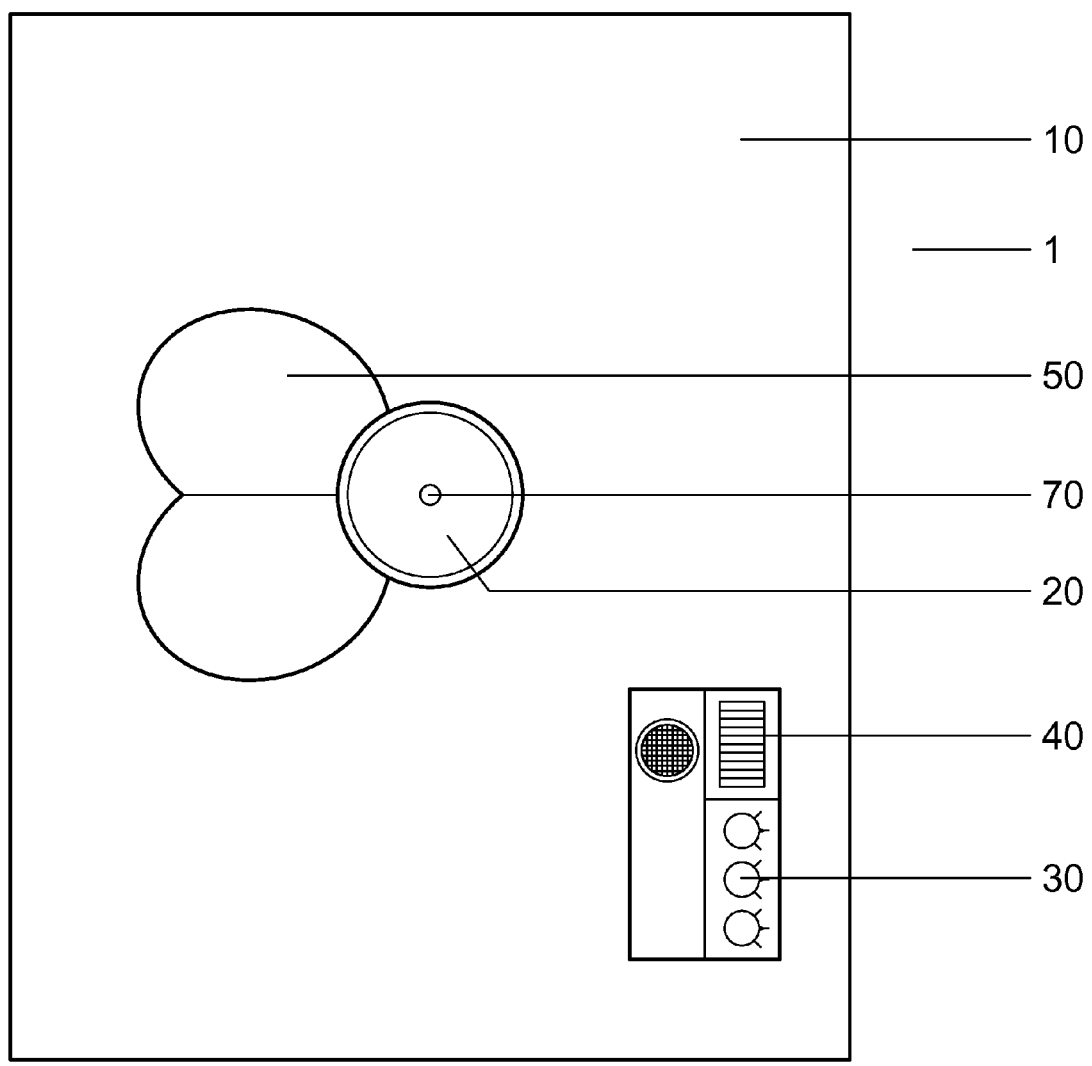
FIG. 1C is a top view of the Device.
Figure 1D:
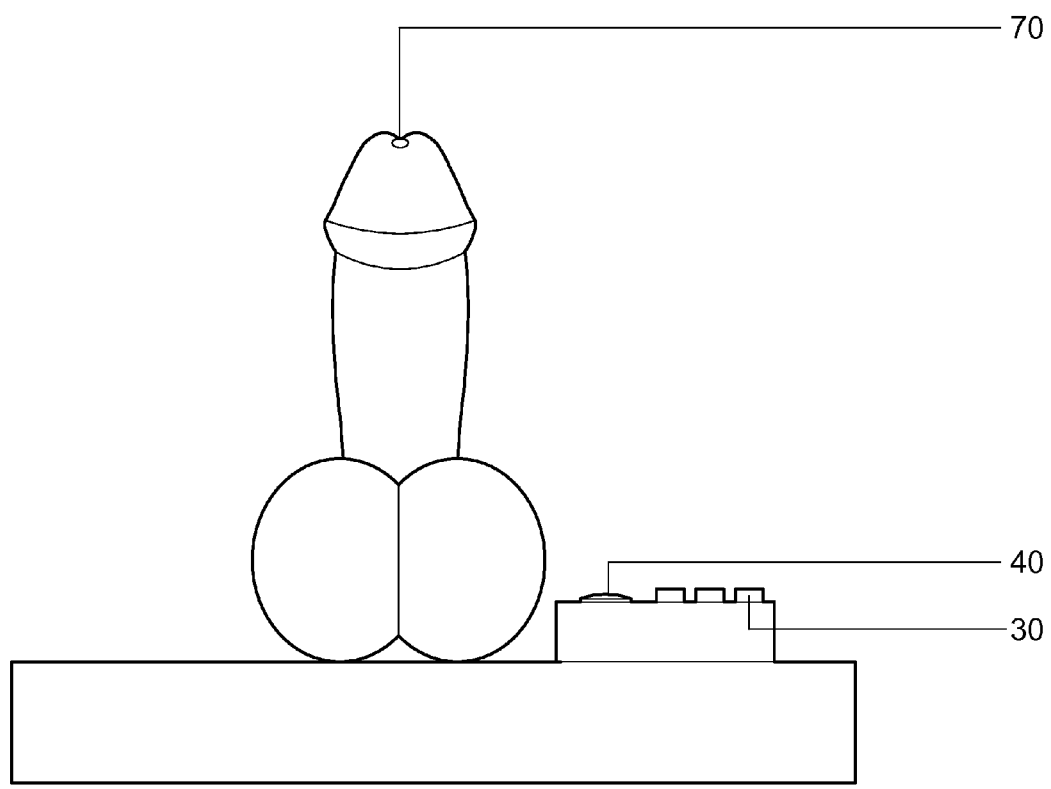
FIG. 1D is a front view of the Device.
Figure 2:
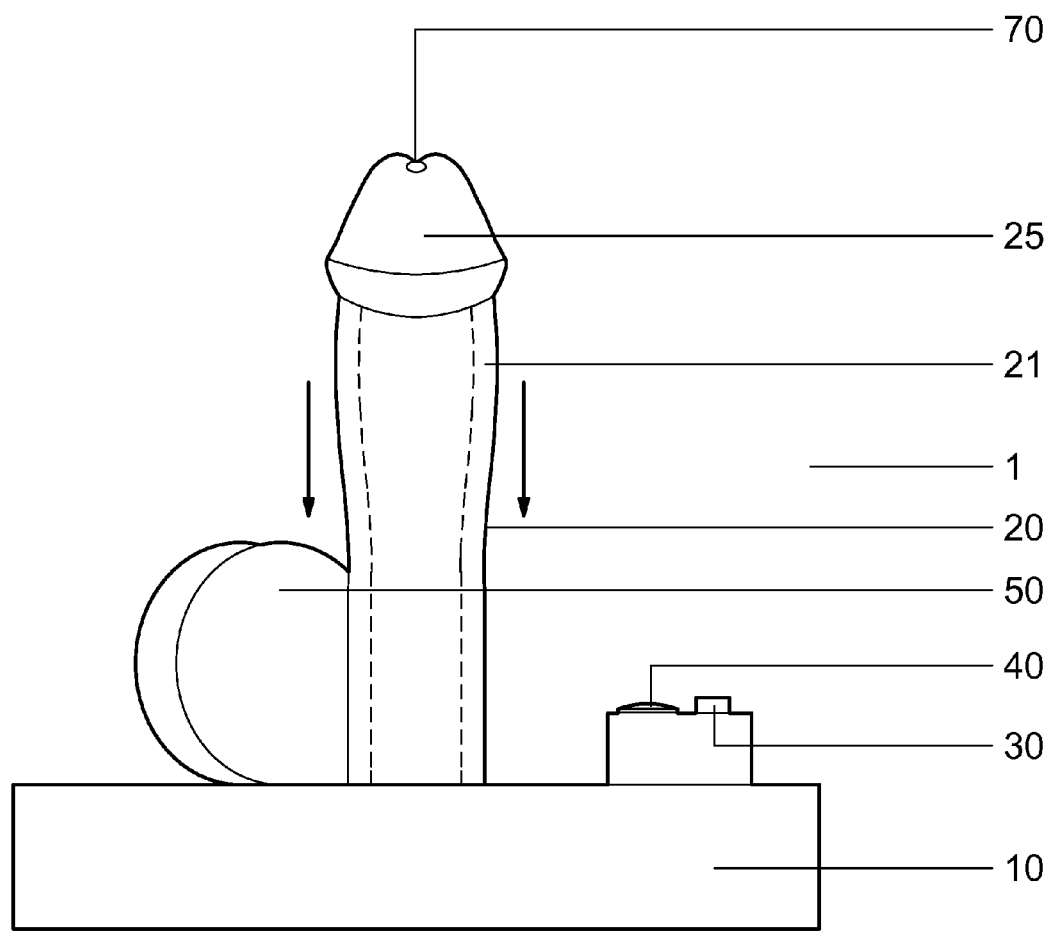
FIG. 2 displays device with the movement of the mock foreskin.

As shown in FIGS. 1A, 1B, 1C and 1D, the device 1 consists of a base 10, a shaft 20 extending from the base 10 with the shaft 20 being in a phallic shape in the shape of a man's penis with a control panel 30 and display means 40 attached to the base 10. FIG. 1A displays the device that simulates a non-circumcised penis while FIG. 1B shows the device that simulates a circumcised penis. As shown in FIG. 2, in the preferred embodiment there will be a simulated foreskin 21 that covers and is attached to the shaft 20 near the tip 25 to simulate a real penis. The simulated foreskin 21 can move up and down the shaft 20 over the sensors 60 and is made of a material that would simulate the look and feel of skin such as a simulated rubber or plastic. There will be sensors 60 the will measure the pull of the simulated foreskin 21 to measure if too much pull or pressure is used that would cause pain or displeasure to a real person.

In the preferred embodiment there would have mock testicles 50 made of a hard swishy material in a sac connected to said shaft 20 in a way that which would simulate a man's testicles. There would be multiple sensors 60 within the shaft 20 of which most would be pressure sensors.

Figure 3:
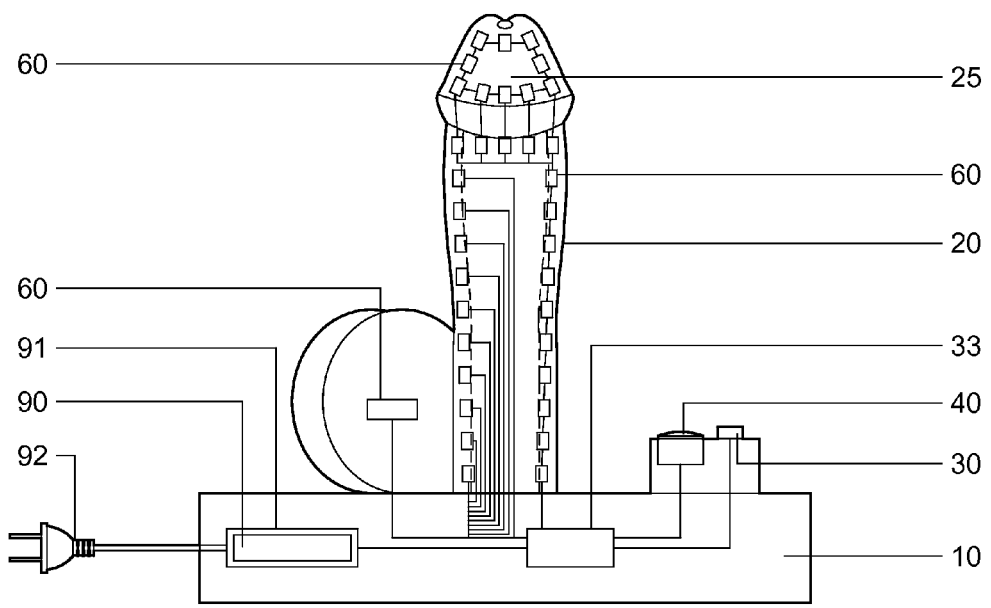
FIG. 3 displays a cross section of the device with the pressure sensors.

These would also be contained in the mock testicles 50 to measure if there is too much pressure on them. There would be a high number of sensors 60 on the tip 25 of the shaft 20 which would similar the high number of nerve endings at the tip of a man's penis as shown in FIG. 3. These sensors 60 are attached to a processing means 33.

Figure 5A:
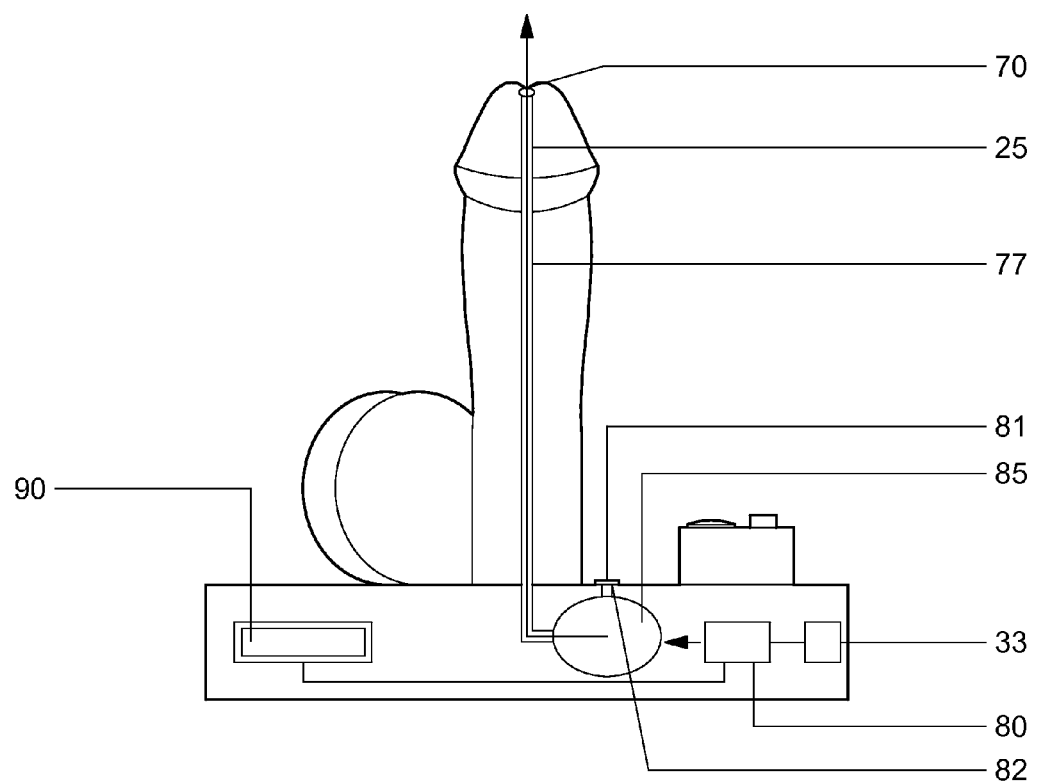
FIG. 5A displays a cross section of the device with a liquid reserve.

As shown in FIG. 5A, in one embodiment of the device 1, the device 1 would simulate ejaculation of semen during an organism. The ejaculate would be store in a reserve storage area 85 and loaded through an input tube 82 with a cap 81. A pump 80 would pump the ejaculate out of the reserve storage area 85 through a tube 77 in the shaft 20 and out a hole 70 in the tip 25 of the shaft 20 which simulates the urethra. The pump 80 would do this when told to by the attached to a processing unit 33 when the processing unit 33 has deemed that a successful climax has been reached based on the input from the sensors 60. It the preferred embodiment, the pump 80 would pump out the ejaculate in two or more quick squirts simulating the process of a real ejaculation. The ejaculate would be of a viscosity and taste similar to semen.

Figure 5B:
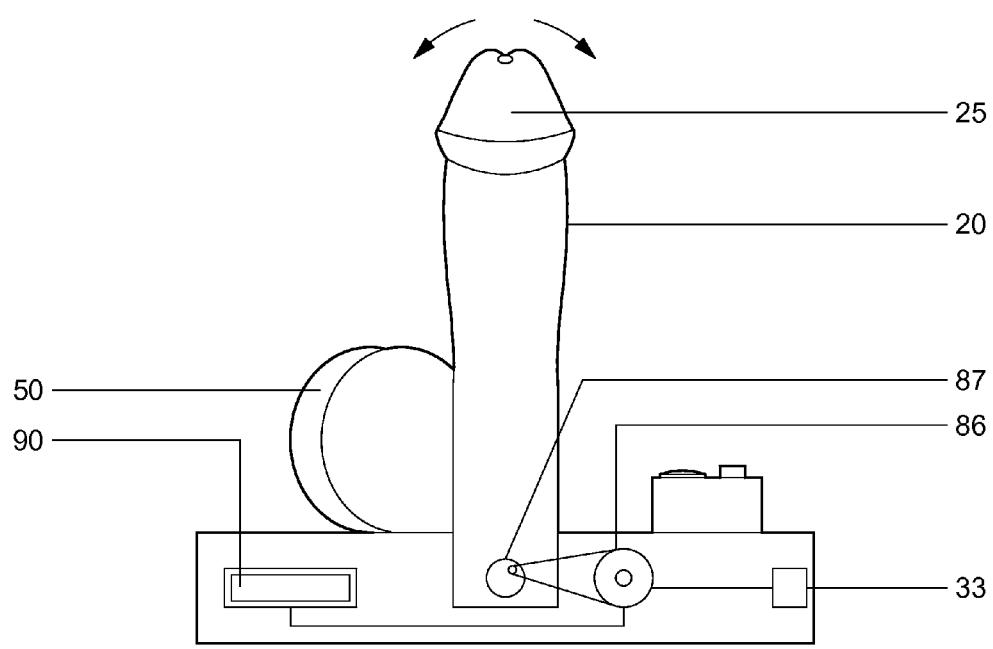
FIG. 5B displays a cross section of the device with a liquid reserve.

In one embodiment of the device 1 as shown in FIG. 5B, the shaft 20 would be connected to a movement means 87 such as a cam or pulley which would be located at the bottom of the shaft 201 the base 10. When an climax is deemed to be reached by the processing unit 33 the processing unit 33 will send a message to the movement driver 86, which in the preferred embodiment would be a simple electronic motor which would be connected to and drive the movement means 87. The movement means 87 would push and pull the shaft 20 moving the shaft 20 slightly back and forth in a throbbing motion to simulate how a penis throbs up and down or back and forth during a organism. In an alternative embodiment, the movement driver 86 can be connected directly to the shaft 20.

Figure 6:
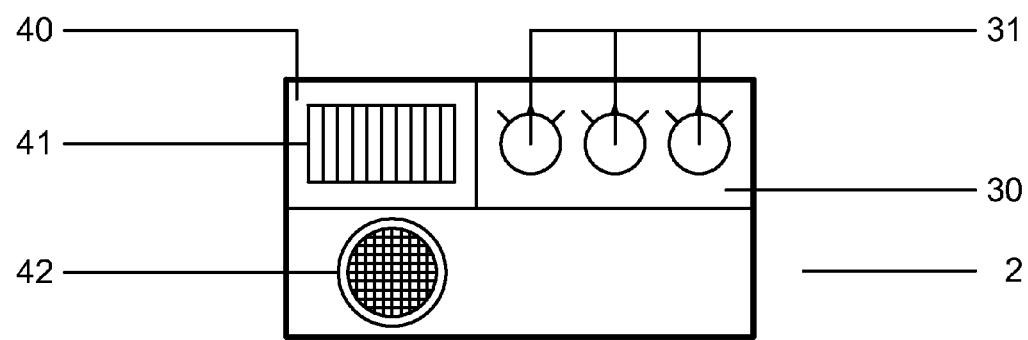
FIG. 6 displays a version of the display and input dials.

As shown in FIG. 6, the control panel 30 and display means 40 would allow a user to program the desires or wants of the user or user's partner. This would be stored in a data storage means 32 and be used by a processing 33 means such as a programmed data processing chip or be used as input to the processing means 33. In the sample of the control panel 30 and the display means 40, the display means 40 would consist of a series of lights 41 with a light lighting as the user gets closer to bringing the device 1 to a simulated organism. When all the lights 41 have lighted a simulated organism has been reached. At that point the lights will flash and a speaker 42 will buzz. In one embodiment, the speaker 41 will play a message in a human voice such as words like "Oh God", "Yes" or a similar language. The device 1 in one embodiment will allow the user to record through own message to be played. This can be in their partner's voice and message.

The control panel 30 allows a user to input the specifics for the device 1 to simulate an organism. In one embodiment there is a plurality of control knobs 31 each with a plurality of positions with each position being an input to the processing means 33 signifying a criteria for a simulated organism. These knobs 31 would control the desired roughness or tenderness i.e. pressure to reach simulated organism, the length of time to reach simulated organism and the number of simulated strokes to reach a simulated organism.

Figure 4:
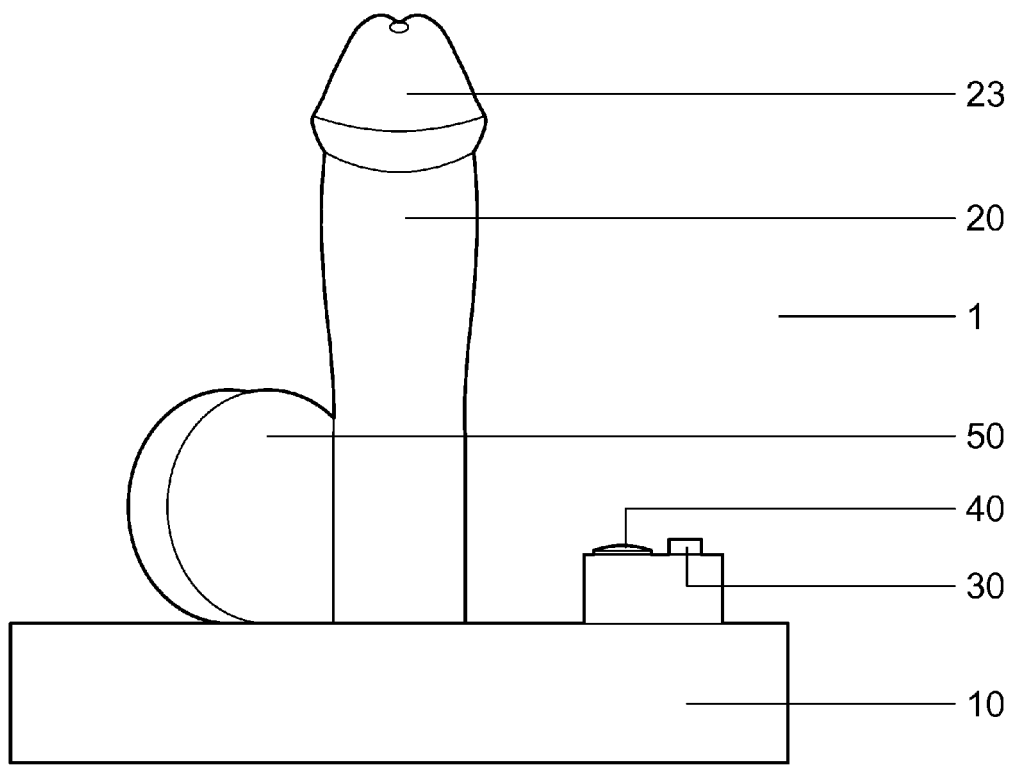
FIG. 4 displays a cross section of the device with the pressure sensors with a too much pressure.

The display means 40 will display how the user is doing showing if the user has performed well enough to reach a climax or if the user has applied too much pressure, not enough pressure or movement or used a sharp pressure such as the caused by the teeth 200 as shown in FIG. 4. There will also be sensors 60 in the mock testicles 50 to measure if too much pressure is applied to them.

Figure 12A:
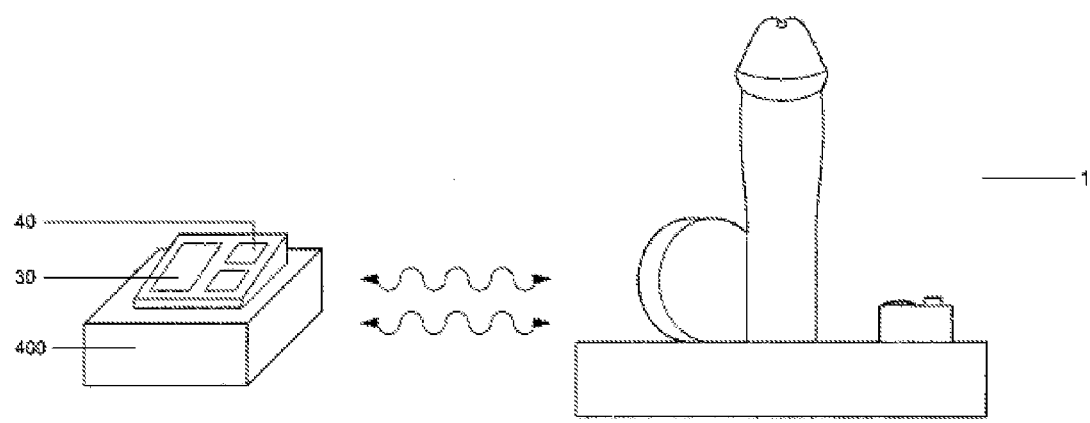
FIG. 12A shows a wireless connection.
Figure 12B:
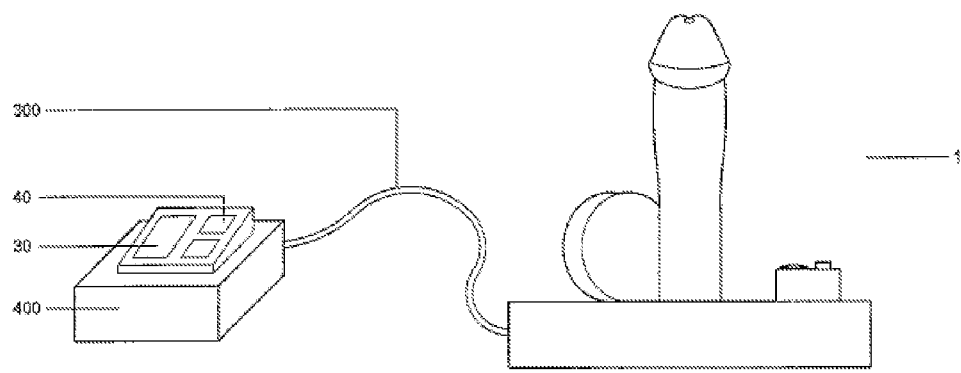
FIG. 12B shows a cable connection.

As shown in FIGS. 12A and 12B, the display means 40 and control panel 30 can be in a separate base 400 and connected through wireless or through a cable 300.

The shaft 20, in the preferred embodiment, is of a standard size for an erected penis which is six inches long and 4 inches in circumference. However, the shaft 20 can be made to be shorter, longer and/or wider to match the needs or desires of the user or to match the size of the user's partner. The color, in the preferred embodiment, would be a one of a plurality of standard flesh color that would match a human's penis. These standard colors would be chosen by the user to match their preference or the match their partner's penis coloring. The shaft 20 as well as the mock testicles 50 can be of a design that matches the partner's penis and testicle.

In an alternative embodiment, the color of the shaft can be any color desired by the user from a bright red to blue to green. This would be more of an option when the device is used as a party game for things like a bridal shower or a potential drinking game.

The base 10 could be in a rectangular shape or square with rounded edges or any shape large enough to succor the shaft 20 so that it is stable when used. In the preferred embodiment the base 10 is in the shape of a rounded rectangular.

If the user so desires the base 10 be covered in a material such as leather. The base 10 would have the power supple 90 in the preferred embodiment. In the preferred embodiment the power supple would be a set of batteries 91. The power source could be a plug 92 for plugging in to a wall socket.

Figure 7:
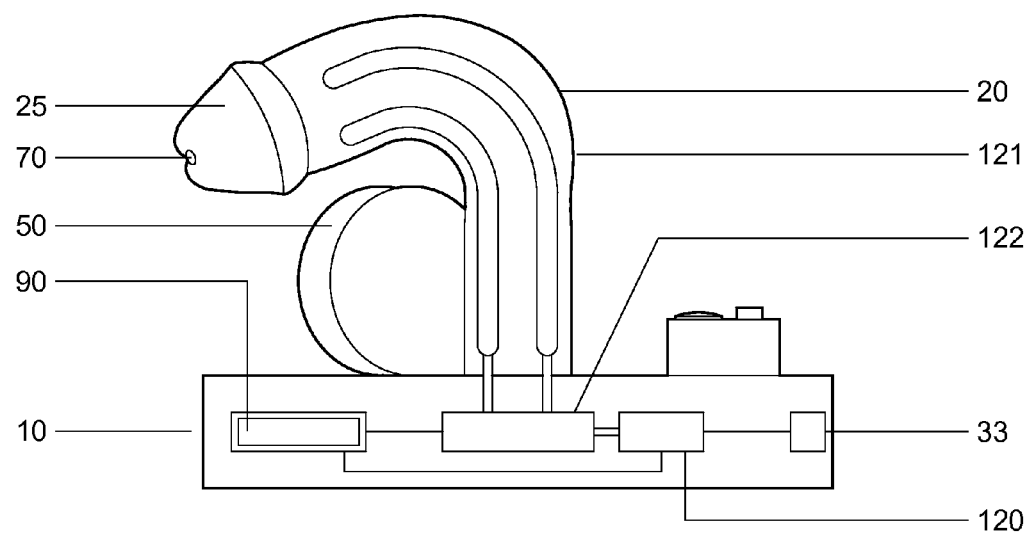
FIG. 7 displays a version of the device flaccid.
Figure 8:
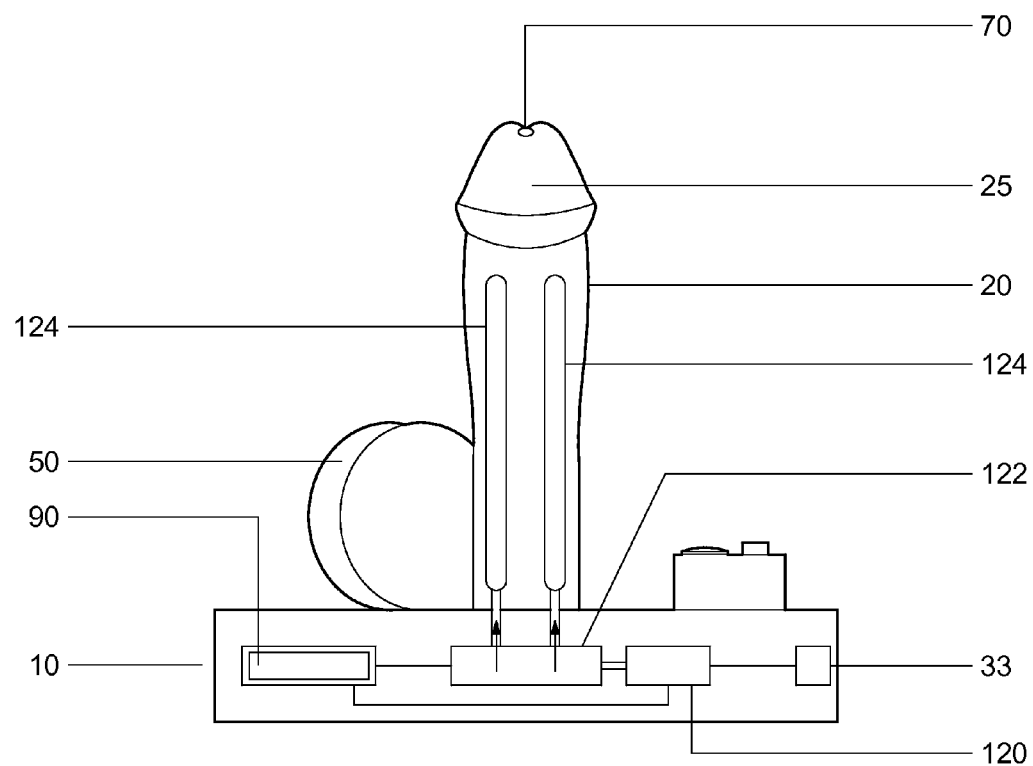
FIG. 8 displays a version of the device erect.
Figure 9:
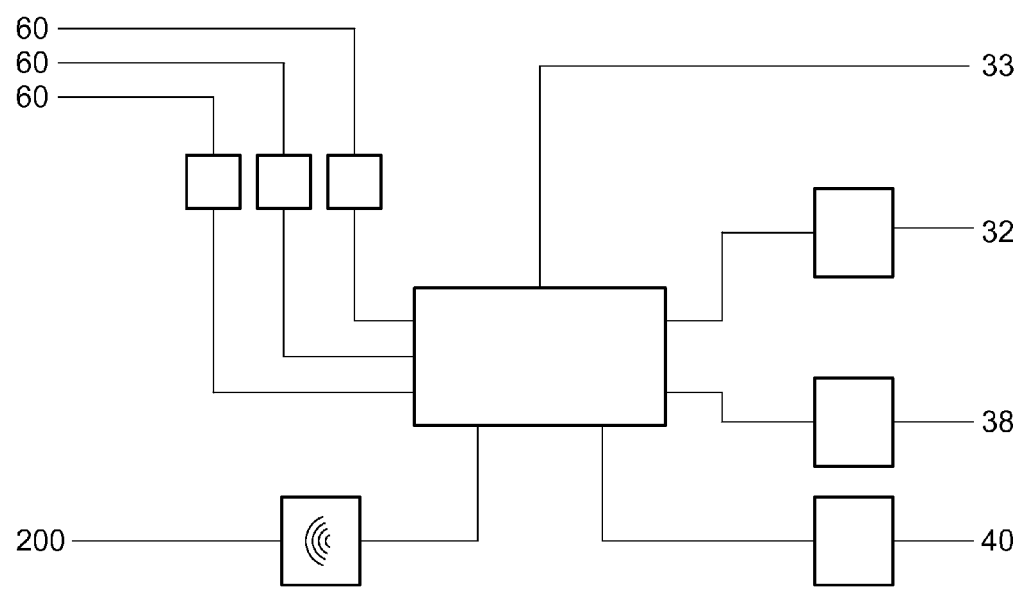
FIG. 9 displays a sample of the electronics of the device.
Figure 10:
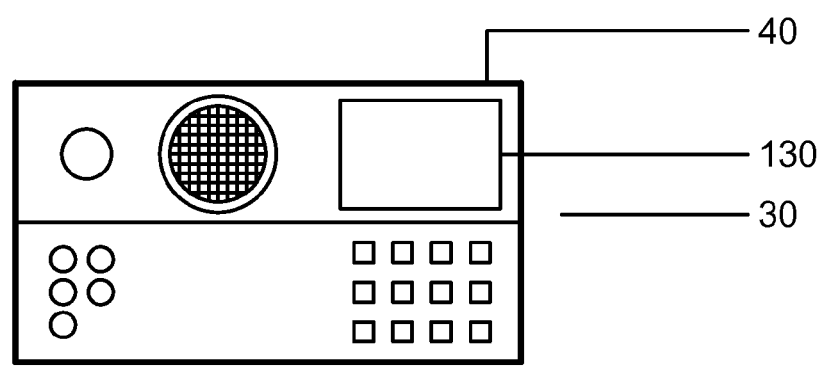
FIG. 10 shows an alternate display and input.
Figure 11A:
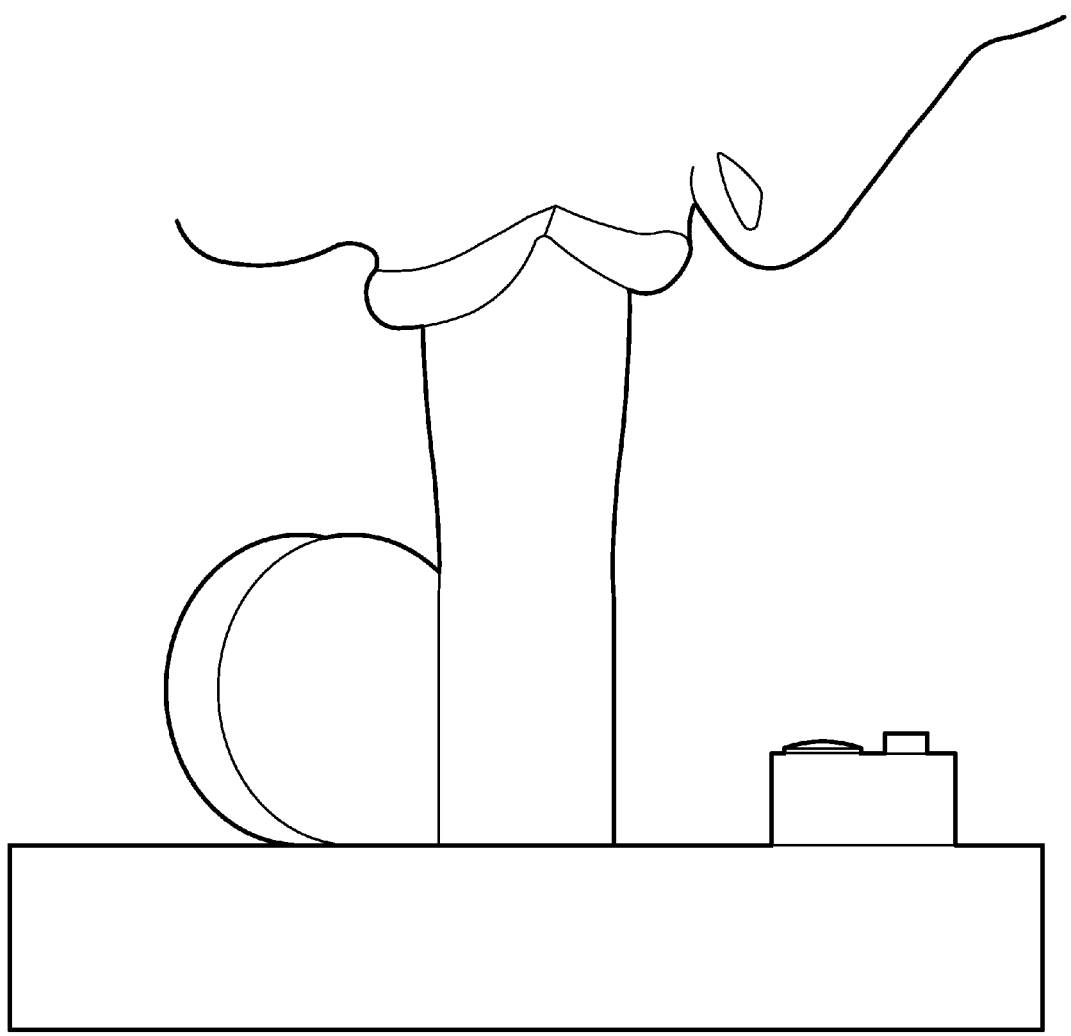
FIG. 11A shows the device being used orally.
Figure 11B:
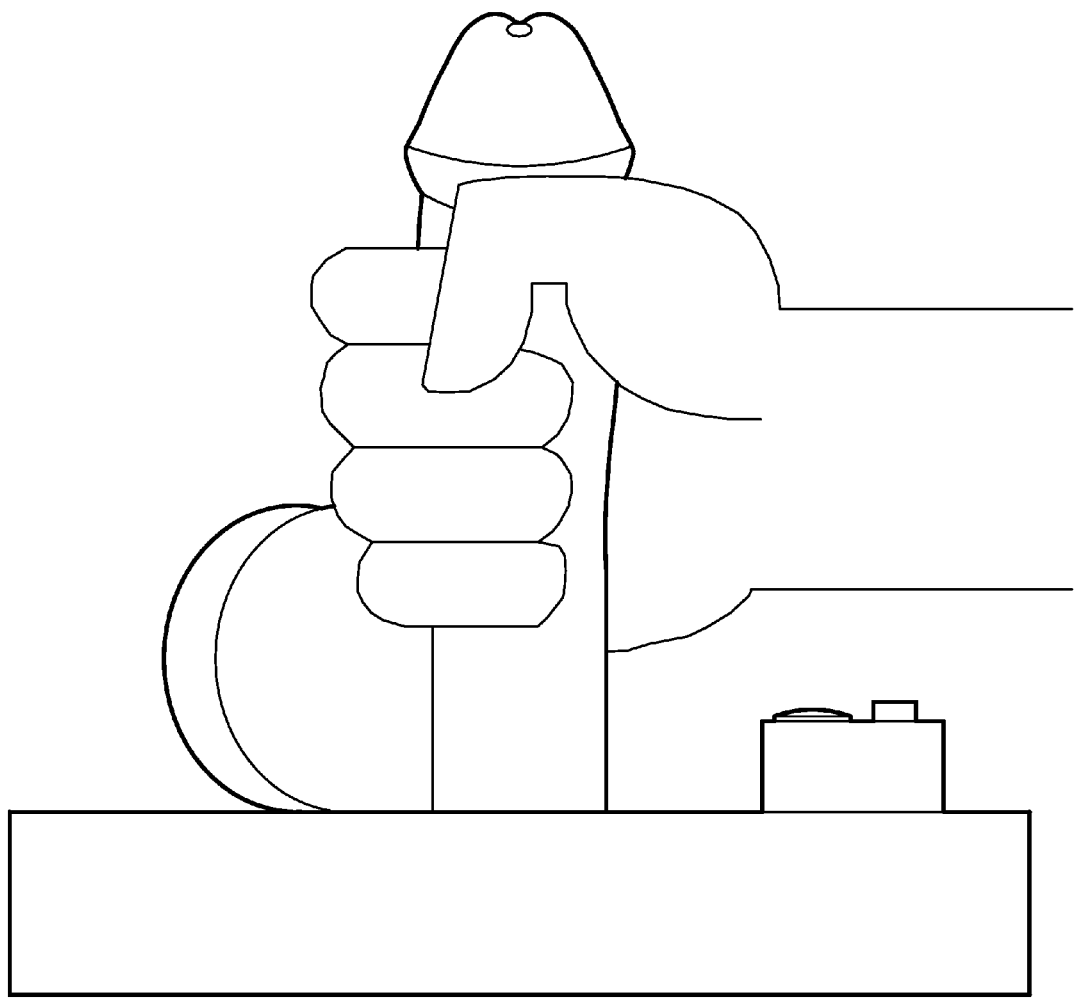
FIG. 11B shows the device being used digitally.
Figure 11C:
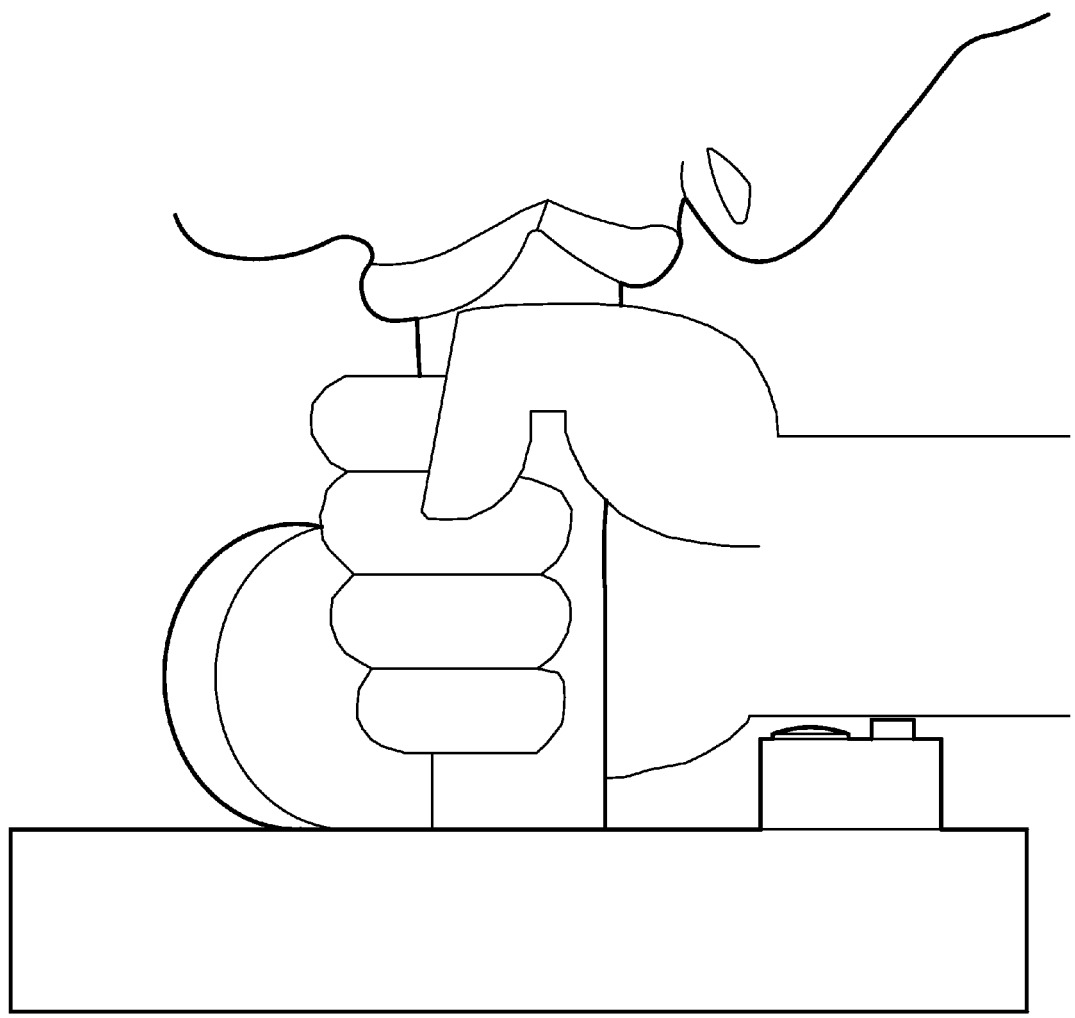
FIG. 11C shows the device being used orally and digitally.

As shown in FIG. 7, one embodiment of the device 1 the shaft would start out simulating a flaccid penis which the user would have to first work to arouse to bring to an erect state as shown in FIG. 8. This would be done by manipulating/touching/sucking on the shaft 20 to make contact and input to the sensors 60 that are connected to the processing unit 33. When the processing unit 33 deems the device 1 to be aroused based on the input and its setting it will cause the shaft 20 to move to an erect position. This will be accomplished, in the preferred embodiment, very similar to how a real human penis goes to an erect position. The shaft 20 will have a plurality erection tubes 124 within it. These erection tubes 124 will be pumped full of either air or a liquid from the erection fluid retainer 122

In one embodiment of the device 1 as shown in FIG. 5A, the liquid reserve 222 would be filled with a desired liquid such as a beverage or alcohol such as soda or vodka or any other such drink. With this configuration the device 1 could be used as a drinking game which would work well with such events such as Bridal Showers. Two devices can even be used in parallel with the first one to get their device 1 to a simulated ejaculation being deemed to be the winner.

The device 1 can also be configured to be used as a training device for manual simulate by hand or feet. The device 1 would use the sensors 60 along the shaft 20 to measure the compression and strokes along the shaft 20. This will be compared to programmed responses in the processing device As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for sexual therapy comprising: a base, a shaft extending from the base with a control panel and display means attached to the base, having the shaft being in a phallic shape where the shaft has sensors within it that are connected to the control panel where the control panel having an input means for inputting data and comparing the input data against the information from the sensors where the display means displays one or more of the following: the input from the sensors, the input from the input means and the comparison between the input from the sensors and the input from the input means.

2. A device according to claim 1 further comprising: the shaft would start out flaccid penis which when the sensors are manipulated would change to an erect state.

3. A device according to claim 1 further comprising: having a plurality of control knobs connected to the control panel.

4. A device according to claim 1 further comprising: having the display means have a plurality of lights.

5. A device according to claim 1 further comprising: having the display means having sound means.

6. A device according to claim 5 further comprising: having the sound means play pre-recorded messages.

7. A device according to claim 1 further comprising: having simulated foreskin that covers and is attached to the shaft ear the tip with sensors that measure the pull on the simulated foreskin.

8. A device according to claim 1 further comprising: having reserve storage area with a pump that would pump liquid out of the reserve storage area through a tube in the shaft and out a hole in the tip of the shaft.

9. A device according to claim 8 further comprising: where the pump would be activate by the control unit.

10. A device according to claim 1 further comprising: having additional sensors at the tip of the shaft.

11. A device according to claim 1 further comprising: having the shaft connected to a movement means.

12. A device according to claim 1 further comprising: mock testicles having sensors in the mock testicle and the sensors being connected to the control panel.

13. A device for sexual therapy comprising: a base, a shaft extending from the base with a control panel and display means attached to the base, having the shaft being in a phallic shape where the shaft has sensors within it that are connected to the control panel, having mock testicles located beneath the shaft with sensors in the mock testicle and the sensors being connected to the control panel, having the shaft connected to a movement means.

14. A device according to claim 13 further comprising: the shaft would start out flaccid penis which when the sensors are manipulated would change to an erect state.

15. A device according to claim 13 further comprising: having a plurality of control knobs connected to the control panel.

16. A device according to claim 13 further comprising: having the display means having sound means.

17. A device according to claim 13 further comprising: having simulated foreskin that covers and is attached to the shaft ear the tip with sensors that measure the pull on the simulated foreskin.

18. A device according to claim 13 further comprising: having reserve storage area with a pump that would pump liquid out of the reserve storage area through a tube in the shaft and out a hole in the tip of the shaft where the pump would be activate by the control unit.

19. A device according to claim 13 further comprising: having additional sensors at the tip of the shaft.

* * * * *